United States Patent
Foti

(10) Patent No.: US 9,215,736 B2
(45) Date of Patent: Dec. 15, 2015

(54) METHOD AND APPARATUS FOR POPULATING M2M RELEVANT IDENTITIES DURING ACCESS NETWORK BEARER SETUP

(71) Applicant: Telefonaktiebolaget L M Ericsson (publ), Stockholm (SE)

(72) Inventor: George Foti, Dollard des Ormeaux (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 128 days.

(21) Appl. No.: 13/892,870

(22) Filed: May 13, 2013

(65) Prior Publication Data

US 2013/0308566 A1     Nov. 21, 2013

Related U.S. Application Data

(60) Provisional application No. 61/648,768, filed on May 18, 2012.

(51) Int. Cl.
    *H04W 4/00*         (2009.01)
    *H04W 76/02*      (2009.01)

(52) U.S. Cl.
    CPC ............ *H04W 76/021* (2013.01); *H04W 4/005* (2013.01)

(58) Field of Classification Search
    CPC .... H04W 76/021; H04W 76/02; H04W 4/005
    USPC ........................................................ 370/329
    See application file for complete search history.

(56) References Cited

U.S. PATENT DOCUMENTS

2010/0329226 A1* 12/2010 Norefors et al. ............... 370/338
2012/0047551 A1* 2/2012 Pattar et al. ....................... 726/1

(Continued)

FOREIGN PATENT DOCUMENTS

CN    WO2011082636 A1 * 7/2011 ............ H04W 48/08
EP          1851904 B1     5/2011

(Continued)

OTHER PUBLICATIONS

European Telecommunications Standards Institute. ETSI TS 102 689 V1.1.1 (Aug. 2010). Machine-to-Machine communications (M2M); M2M service requirements, Aug. 2010, pp. 1-34, Sophia Antipolis Cedex, France.

(Continued)

*Primary Examiner* — Dang Ton
*Assistant Examiner* — Abdeltif Ajid
(74) *Attorney, Agent, or Firm* — Murphy, Bilak & Homiller, PLLC

(57) ABSTRACT

The present invention enables populating one or more M2M-relevant identities in an access network when establishing an access bearer between the access network and an M2M device for connecting the M2M device with an M2M service provider (SP). The teachings herein provide, on the device side, for transmitting one or more selected M2M identifiers from an M2M device during the bearer establishment procedure. On the network side, the teachings herein provide for receiving the selected M2M identifier(s) during the bearer establishment procedure, associating them with the access bearer being established, and recording them as being associated with the access bearer. While such M2M identifiers have no specific meaning in the access network domain, one of the advantages of the teachings herein is that the recorded M2M identifiers can be used for improved billing reconciliation between the access network provider and the M2M SP.

9 Claims, 3 Drawing Sheets

(56) References Cited

U.S. PATENT DOCUMENTS

| | | | |
|---|---|---|---|
| 2012/0203894 A1* | 8/2012 | Lee et al. | 709/224 |
| 2012/0231828 A1* | 9/2012 | Wang et al. | 455/509 |
| 2012/0278903 A1 | 11/2012 | Pugh | |
| 2012/0287854 A1* | 11/2012 | Xie et al. | 370/328 |

FOREIGN PATENT DOCUMENTS

| | | | |
|---|---|---|---|
| WO | WO 2011082636 | * | 7/2011 |
| WO | 2011098150 A1 | | 8/2011 |
| WO | 2011112683 A1 | | 9/2011 |

OTHER PUBLICATIONS

European Telecommunications Standards Institute. ETSI TS 102 690 V1.1 .1 (Oct. 2011). Machine-to-Machine communications (M2M); Functional architecture, Oct. 2011, pp. 1-280, Sophia Antipolis Cedex, France.

European Telecommunications Standards Institute. ETSI TS 102 921 V1.1 .1 (Feb. 2012). Machine-to-Machine communications (M2M); mIa, dIa and mId interfaces, Feb. 2012, pp. 1-538, Sophia Antipolis Cedex, France.

Ray, I. et al. "Concurrent and Real-Time Update of Access Control Policies." Proceedings of the 14th International Conference on Database and Expert Systems, Sep. 1-5, 2003, pp. 330-339. Prague, Czech Republic.

Ray, I. et al. "Implementing Real-Time Update of Access Control Policies." IFIP TC11/WG11.3 Eighteenth Annual Conference on Data and Applications Security Jul. 25-28, 2004, pp. 65-80, Sitges, Catalonia, Spain.

3rd Generation Partnership Project, "3GPP TS 23.682 V 11.0.0 (Mar. 2012)," 3rd Generation Partnership Project; Technical Specification Group Services and System Aspects; Architecture Enhancements to Facilitate Communications with Packet Data Networks and Applications. Mar. 2012. pp. 1-24.

Author Unknown, "M2M Service Enablement," Telefon AB LM Ericsson; European Telecommunications Standards Institute (ETSI); M2M(12)19-076; Mar. 8, 2012. pp. 1-10.

Author Unknown, "Machine-to-Machine Communications (M2M); Functional Architecture," ETSI TS 102 690 V2.0.4 (Apr. 2012); Technical Specification; Apr. 25, 2012. pp. 1-291.

Author Unknown, "Mapping Aspects for ETSI M2M Architecture," Ericsson, ST-Ericsson; 3GPP TSG SA WG2 Meeting #85; TD-S2-112291; May 16-20, 2011. pp. 1-11.

ETSI, "Machine-to-Machine communications (M2M); Functional architecture", Draft ETSI TS 102 690 V0.14.2, Sep. 2011, 1-283.

* cited by examiner

METHOD AND APPARATUS FOR POPULATING M2M RELEVANT IDENTITIES DURING ACCESS NETWORK BEARER SETUP

RELATED APPLICATIONS

This application claims priority from the U.S. provisional patent application filed on 18 May 2012 and assigned Application No. 61/648,768 and which is incorporated herein.

TECHNICAL FIELD

The present invention generally relates to the handling of Machine-to-Machine (M2M) identifiers, and particularly relates to populating M2M relevant identifiers during access network bearer setup.

BACKGROUND

Machine-to-Machine (M2M) communications makes use of both an M2M service plane provided by an M2M service provider network and a transport plane provided by an access network. For example, an M2M device has an access-network part, such as a cellular modem and stored access network identifiers or credentials that allow the device to establish a communications bearer with an access network. In turn, the M2M device has an M2M part, e.g., an M2M application and corresponding subscription credentials, for communicating with an M2M service provider that is reachable via communications carried through the access network.

In some instances the access network provider and the M2M service provider are one and the same. In other instances they are separate entities. In cases where the access network provider and the M2M service provider are distinct from each other, the access network provider bills the M2M service provider for the usage of the access network.

In turn, the M2M service provider generally will bill its customers for the access network charges. In general, access networks assess usage charges based on the access network identifier of the device in question, such as a Mobile Station International Subscriber Directory Number (MSISDN) or an IP or domain name address assigned to the device. This approach is workable from the perspective of the M2M service provider if all of the M2M traffic to/from the device is associated with one entity, e.g., with a single M2M application, or if a single M2M service provider is associated with a single device.

However, many M2M devices can run a plurality of M2M applications and each application may be associated with a different billing entity. In such cases, the access network address or identifier of the M2M device provides insufficient granularity for billing different M2M services used by the same M2M device, and will not allow the M2M service provider to properly invoice its customers for the data consumed by their respective M2M applications.

Similar problems arise from the perspective of the access network provider, inasmuch as an M2M device that runs a plurality of different applications, each application communicating with at least one different M2M service provider, may result in a situation where the access network provider will not have sufficient information to determine who to bill for each transaction. This circumstance could result in the owner of the M2M device paying both access network and M2M service provider network charges and it complicates properly allocating access network charges with respect to different M2M services running on the same device, and such splitting of charges between M2M service providers is not commonly done.

SUMMARY

The present invention enables populating one or more M2M-relevant identities in an access network when establishing an access bearer between the access network and an M2M device for connecting the M2M device with an M2M service provider (SP). The teachings herein provide, on the device side, for transmitting one or more selected M2M identifiers from an M2M during the bearer establishment procedure, where the M2M identifier(s) belong to the M2M SP rather than to the access network. On the network side, the teachings herein provide for receiving the selected M2M identifier(s) during the bearer establishment procedure, associating them with the access bearer being established, and recording them as being associated with the access bearer. While such M2M identifiers have no specific meaning in the access network domain, one of the advantages of the teachings herein is that the recorded M2M identifiers can be used for improved billing reconciliation between the access network provider and the M2M SP.

One embodiment comprises a method at an M2M device of enabling the population by an access network of one or more M2M-relevant identities during access network bearer setup—i.e., the population by the access network of one or more access network records or data items with the M2M-relevant identities received from the M2M device during access bearer establishment signaling. Such population enables, e.g., usage tracking and billing reconciliation by the access network as a function of the M2M identifiers received from the M2M device and/or usage of the M2M identifiers by the access network in control or configuration decisions, e.g., determining Quality-of-Service (QoS) parameters, etc.

In any case, the method includes determining that an access bearer with the access network is required, for connecting the M2M device with an M2M service provider, and selecting one or more M2M identifiers, belonging to the M2M service provider, from among the following M2M-relevant identities: an M2M application identifier, an M2M subscription identifier, and an M2M Services Capability Layer (SCL) identifier. The method further includes initiating an access bearer establishment procedure with the access network to establish the access bearer, and transmitting the selected one or more M2M identifiers during the access bearer establishment procedure.

A complementary embodiment comprises a method at an access network node of populating one or more M2M relevant identities in one or more access network records or data items during access network bearer setup for an M2M device. The method includes receiving a request from the M2M device, requesting establishment of an access bearer for connecting the M2M device to an M2M service provider, wherein the request includes one or more M2M identifiers, belonging to the M2M service provider, from among the following M2M-relevant identities: an M2M application identifier, an M2M subscription identifier, and an M2M SCL identifier. The method further includes establishing an access bearer for the M2M device responsive to the request, associating the one or more M2M identifiers received in the request with the access bearer and recording the one or more M2M identifiers as being associated with the access bearer. Such recording supports, for example, QoS or other control or configuration decisions made with respect to establishing or maintaining the bearer and/or later billing reconciliation, based on knowing the M2M identifier(s) associated with usage of the bearer.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Embodiments of the present invention will now be described, by way of example only, with reference to the attached Figures, wherein.

DETAILED DESCRIPTION

Figure 1:
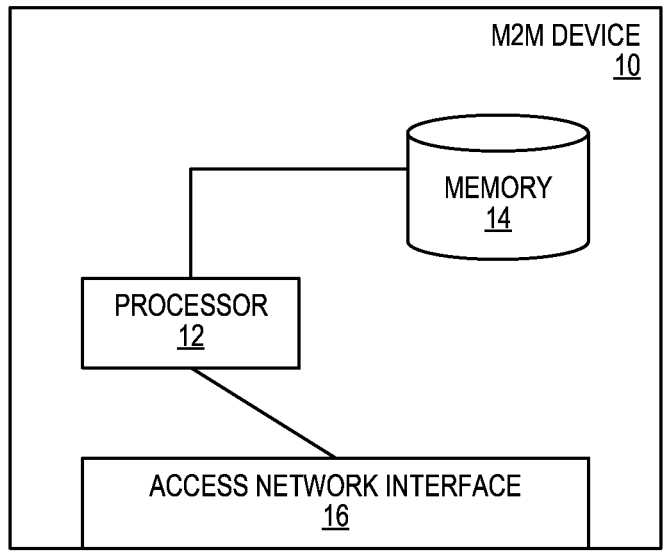
FIG. 1 is a block diagram of an M2M device according to an embodiment of the present invention.

The teachings herein are directed to a system and method for the handling of M2M identifiers associated with Machine-to-Machine (M2M) devices to support interaction, e.g., billing reconciliation, between an M2M service provider (SP) and an access network provider, where the M2M SP is associated with an M2M SP network and one or more M2M devices that uses services provided by that network, and where the access provider is associated with an access network that is used by the M2M devices to access the M2M SP network.

In this context, there is a need to correlate records produced by the transport plane—i.e., the access network—and the M2M service plane, which is an M2M Network Services Capability Layer or M2M NSCL. Such a correlation allows for reconciliation of the byte count for data recorded at the M2M service plane with that produced by the access network. This byte count is often used for billing the M2M service provider for the network capacity used. In an HTTP-based, non-limiting example, the M2M service plane typically records the byte count in four fields: the Request Headers size, Request Body size, Response Headers size, and Response Body size. Such data may be identified differently if other protocols are used. However, in general, such data can be validated against the total byte count recorded by the access network for the corresponding usage.

Reconciliation is mostly used, but not restricted, to accounting settlements in support of business agreements. To enable accounting settlements on a per application basis, which is particularly useful when the M2M SP supports a plurality of applications, and/or where different applications requires different Quality of Service from the access network, the M2M application ID can be included in the records produced by the access network. To facilitate this, the M2M device can transmit the application ID during the bearer establishment procedure undertaken by the M2M device. This will associate an M2M application ID with the access network bearer that the M2M device intends to use for M2M communication with the M2M NSCL related to the application. In at least some of the embodiments herein, it is preferred that the M2M device establishes a separate access network bearer for every M2M application. The use of separate access network bearers simplifies a full reconciliation of access network usage on a per-application basis with respect to the different M2M applications running on the M2M device.

With reference to the 3GPP TS 24.008 specification entitled "3rd Generation Partnership Project; Technical Specification Group Core Network and Terminals; Mobile radio interface Layer 3 specification; Core network protocol; Stage 3" (which is incorporated herein by reference), it is proposed in this disclosure to use the Protocol Configuration Options (PCO) Information Element (IE) field to carry one or more M2M identifiers, such as M2M application identifiers during a Packet Data Protocol context activation. Hence, one aspect of the teachings herein proposes the advantageous usage of the PCO for transferring one or more M2M identifiers from an M2M device to an access network during bearer establishment procedures.

In particular, in some embodiments, to enable the correlation between records produced by the M2M NSCL and those produced by the access network, an M2M device can include its M2M application identifier when it acquires an access network bearer to carry M2M traffic. In an example of this approach, an M2M device, upon determining that a bearer should be created will include, in at least one of the bearer establishment messages, its M2M application identifier (M2M Application ID). This identifying information is then received by the access network and is stored to facilitate later reconciliation between the access network usage records and the M2M SP usage records.

In addition, it may be advantageous to use the M2M Services Capability Layer Identity (denoted as the "M2M SCL-ID" or "M2M SCL identifier"), to correlate records produced by the transport plane provided by the access network and the M2M NSCL provided by the M2M SP. This usage enables a reconciliation of the byte count for data recorded at the M2M service plane with that produced by the access network. The M2M service plane records the byte count in four fields: the Request Headers size, Request Body size, Response Headers size, and Response Body size. This data can be correlated with the total byte count recorded by the access network, both for reconciliation and validation purposes.

As noted above, reconciliation is mostly used, but not restricted, to accounting settlements in support of business agreements. To enable accounting settlements on a per M2M SCL-ID basis, the M2M SCL ID can be included in the records produced by the access network. To enable such recording, an M2M device as contemplated in one or more embodiments herein transmits its M2M SCL-ID during the bearer establishment procedure undertaken by the M2M device. This method enables the access network to associate the M2M SCL-ID with the bearer that the M2M device intends to use for M2M communication with the M2M NSCL. As noted earlier, the PCO as provided for in 3GPP TS 24.008 may be advantageously used for sending the M2M SCL-ID and/or another M2M identifier from the M2M device to the access network, during the bearer establishment procedure.

In one embodiment, to enable correlation between records produced by the M2M NSCL and those produced by the access network on a per SCL ID basis, the M2M device can include its M2M SCL-ID when it acquires an access network bearer to carry M2M traffic. In more example implementation detail, the M2M device is configured so that, upon determining that a bearer should be created for M2M communications, it will include the M2M SCL-ID associated with the communications, in at least one of the bearer establishment messages sent from it to the access network for bearer establishment. In turn, the access network receives the M2M SCL-ID and stores it to facilitate later reconciliation between the access network usage records and the M2M SP records.

Reconciliation may be done with respect to the byte count for data recorded at the M2M service plane with that produced by the access network for usage of the established bearer, where the access network associates that usage with the M2M SCL-ID received during the bearer establishment procedure. The M2M service plane records the byte count in four fields, for example: the Request Headers size, Request Body size, Response Headers size, and Response Body size. This data can be validated against the total byte count recorded by the access network for usage of the bearer.

As noted above, reconciliation is mostly used, but not restricted, to accounting settlements in support of business agreements. To enable accounting settlements on a per M2M subscription ID basis, the M2M subscription ID can be included in the records produced by the access network. To facilitate the access network recording the M2M Subscription ID, the M2M device in one or more configurations contemplated herein transmits its M2M subscription identifier (also referred to as the "M2M Subscription ID") as one of the one or more M2M identifiers it sends to the access network during a bearer establishment procedure undertaken by the M2M device.

Based on receiving the M2M subscription identifier from the M2M device, the access network associates usage of the established bearer with the M2M subscription identifier received from the M2M device. In turn, the recording of the M2M subscription identifier in association with usage of the bearer as tracked in the access network enables reconciliation of that usage with the M2M SP usage records, on a per M2M subscription basis. In an example case, the M2M device uses the PCO as provided in 3GPP TS 24.008 for sending the involved M2M subscription identifier to the access network.

More broadly, in one or more embodiments contemplated herein, to enable correlation between records produced by the M2M NSCL and those produced by the access network, the M2M device includes its M2M subscription ID when it acquires an access network bearer to carry M2M traffic. For example, upon determining that a bearer should be created, the M2M device includes, in at least one of the bearer establishment messages, the M2M Subscription ID associated with the M2M communications for which the bearer is being established. This identifying information is then received by the access network and stored to facilitate later reconciliation between the access network usage records and the M2M SP records.

With the above example configurations and processing operations in mind, FIG. 1 illustrates an example embodiment of a M2M device 10 as configured according to the teachings herein. The example M2M device comprises a processor 12, a memory 14, and an access network interface 16. The M2M device 10 stores M2M applications (optionally with associated application identifiers) in the memory 14, which are executed on the processor 12. In this regard, those skilled in the art will appreciate that the M2M device 10 may have a one-to-one correspondence with a physical device; however, it is possible, also, for a single physical device to host more than one M2M device 10 and the association between processing and memory resources and M2M devices 10 may be adjusted accordingly.

Regardless, when the M2M device 10 needs to communicate to an M2M SP, the processor 12 initiates an access bearer establishment procedure through the access network interface 16. As part of the establishment procedure, the processor 12 provides both a device identifier and an M2M identifier, such as an M2M application identifier, an M2M subscription identifier and/or an M2M SCL identifier. These M2M identifiers can be stored in the memory 14, and are typically associated either with the M2M device 10, or with a particular M2M application on the M2M device 10.

In the above example, it will be understood that the "device identifier" that is sent along with the M2M identifier(s) by the M2M device 10 during the access bearer establishment procedure identifies the M2M device 10 with respect to the access network, rather than with respect to the M2M SP network. In one example, the device identifier in question is an International Mobile Subscriber Identifier (IMSI), MSISDN, or the like. As such, the M2M device 10 will be understood as a having an IMSI, MSISDN or other such device identifier that is used by the access network for authenticating and authorizing the M2M device 10 with respect to the access network.

Further, it will be understood that the M2M identifier(s) that are advantageously sent by an M2M device 10 according to the teachings herein are sent during access bearer establishment in addition to any such access network identifiers, and that the M2M identifier(s) in question belong to the M2M SP rather than to the access network. In other words, whereas the device identifier sent from the M2M device 10 during access bearer establishment has meaning within the access network domain, e.g., for access network authentication, the M2M identifier(s) that are additionally sent from the M2M device 10 when establishing an access bearer with the access network for M2M communications have meaning within the M2M SP domain and not within the access network domain. However, while these M2M identifiers are not generated or owned by the access network and have no specific meaning within the access network domain, the teachings herein detail advantageous embodiments where sending such M2M identifiers to the access network during bearer establishment allows the access network to associate such identifiers with usage of the access bearer, e.g., for billing reconciliation with the M2M SP and/or for other purposes.

Broadly, then, an example M2M device 10 as taught herein is configured to enable the population by an access network of one or more M2M-relevant identities during access network bearer setup. Such recording supports, for example, QoS or other control or configuration decisions made with respect to establishing or maintaining the bearer and/or later billing reconciliation, based on the access network knowing the M2M identifier(s) associated with usage of the bearer. The M2M device 10 includes an access network interface 16 configured for communicating with the access network and a processor 12 that is operatively associated with the access network interface 16.

The processor 12 is configured to determine that an access bearer with the access network is required, for connecting the M2M device with an M2M service provider, and to select one or more M2M identifiers from among the following M2M-relevant identities: an M2M application identifier, an M2M subscription identifier, and an M2M Services Capability Layer (SCL) identifier. It will be understood, of course, that M2M application identifiers identify different M2M applications on the M2M device 10, that M2M SCL identifiers identify the M2M device 10 within a given M2M SP NSCL, and that M2M subscription identifiers identify the M2M device 10 with respect to specific M2M service subscriptions. Based on its selection of the one or more M2M identifiers to transfer to the access network during the access bearer establishment, the processor 12 is configured to initiate an access bearer establishment procedure with the access network to establish the access bearer, and to transmit the selected one or more M2M identifiers during the access bearer establishment procedure.

In another embodiment, a machine-readable medium stores computer readable program code that, when executed by a processor 12 in an M2M device 10, configures the M2M device 10 to enable population by an access network of one or more M2M-relevant identities during access network bearer setup. Such recording supports, for example, QoS or other control or configuration decisions made with respect to the access network establishing or maintaining the bearer and/or later billing reconciliation, based on the access network knowing the M2M identifier(s) associated with usage of the bearer. Such operations are based on computer readable program code configuring the processor to determine that an access bearer with the access network is required, for connecting the M2M device with an M2M service provider and to select one or more M2M identifiers from among the following M2M-relevant identities: an M2M application identifier, an M2M subscription identifier, and an M2M Services Capability Layer (SCL) identifier. The computer readable program code further configures the processor 12 to initiate an access bearer establishment procedure with the access network to establish the access bearer, and transmit the selected one or more M2M identifiers during the access bearer establishment procedure.

As noted earlier herein, the selected M2M identifier(s) are not used by the access network for authorizing the M2M device 10 with respect to connecting to the access network. In that respect, it will be understood herein that the M2M identifiers are sent by the M2M device 10 during the bearer establishment procedure in addition to whatever device identifier(s) the M2M device 12 sends to the access network for authenticating/authorizing the M2M device 10 for connection to the access network.

From the above example, the processor 12/M2M device 10 may be configured to perform a method whereby the access network is enabled to populate one or more M2M-relevant identities during a bearer establishment procedure with the M2M device 10. As noted, such population allows the access network to record the M2M-relevant identity or identities for use in determining one or more parameters to be used in establishing or maintaining the bearer and/or for use in accounting/billing operations, wherein the M2M-relevant identities are recorded in association with the usage records determined by the access network for the bearer.

In another example of such a method, upon determining that an access bearer is required, the M2M device 10 selects an M2M identifier for association with the access bearer. In the access bearer establishment procedure, an (access network) identifier of the M2M device and the selected M2M identifier are transmitted to the access network for association with the bearer. As noted above, in different embodiments, the selected M2M identifier can be any one of: an M2M application identifier, an M2M subscription identifier and an M2M SCL identifier. Further, it will be appreciated that in different embodiments, combinations of any of the three recited M2M identifiers can be selected, alone, in combination with each other, or in combination with other identifiers. Such operations provide the access network with at least two identifiers to record against the access bearer consumption data.

Figure 2:
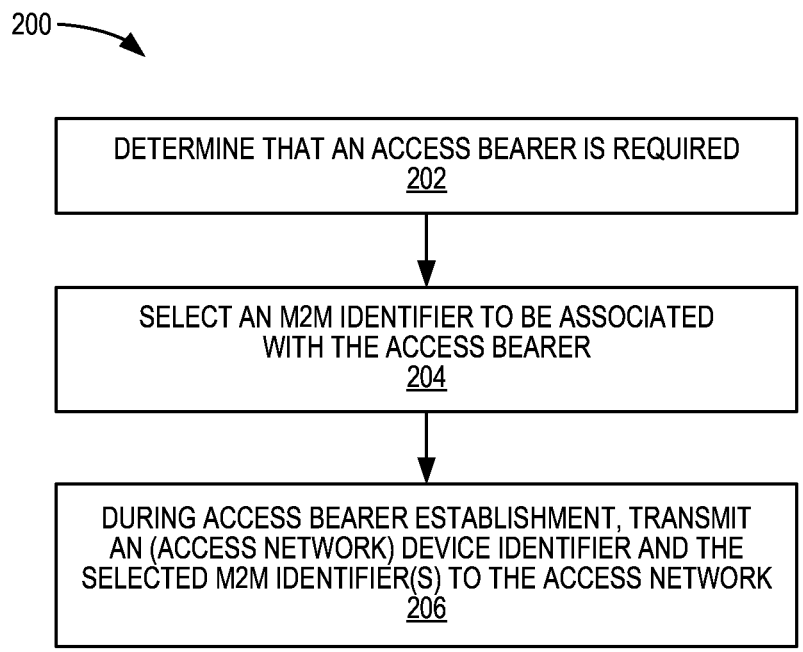
FIG. 2 is a flowchart illustrating a method according to an embodiment of the present invention.

Another example method is illustrated in FIG. 2, where one sees a method 200 that is performed by a M2M device 10 according to one aspect of the teachings herein. The method 200 enables the population by an access network of one or more M2M-relevant identities during access network bearer setup.

In the illustrated example, the method 200 comprises: determining (Block 202) that an access bearer with the access network is required, for connecting the M2M device with an M2M service provider; selecting (Block 204) one or more M2M identifiers from among the following M2M-relevant identities: an M2M application identifier, an M2M subscription identifier, and an M2M SCL identifier; and (Block 206) initiating an access bearer establishment procedure with the access network to establish the access bearer, and transmitting the selected one or more M2M identifiers during the access bearer establishment procedure.

In the same embodiment or in a variation thereof, the step of selecting (Block 204) the one or more M2M identifiers comprises selecting at least the M2M subscription identifier. Additionally, or alternatively, the step of selecting (Block 204) the one or more M2M identifiers comprises selecting at least the M2M subscription identifier and at least one of the M2M SCL identifier and the M2M application identifier.

In the same or other embodiments, selecting (Block 204) the one or more M2M identifiers includes determining that an M2M application for which the access bearer is being established has a particular Quality of Service (QoS) requirement, such that Block 206 includes transmitting the M2M application identifier as one of the one or more selected M2M identifiers.

The bearer establishment procedure is a PDP context activation in one or more contemplated examples, and transmitting (Block 206) the selected one or more M2M identifiers comprises indicating the selected one or more M2M identifiers in a PCO IE field in PDP context activation signaling sent from the M2M device 10.

Also, it will be appreciated with respect to the method 200 and more generally herein, that determining (Block 202) that an access bearer is required by the M2M device 10 comprises, for example, determining that there is M2M traffic to be carried between the M2M device and the M2M service provider. In this context, the M2M application identifier, the M2M subscription identifier, and the M2M SCL identifier correspond to an M2M subscription, an M2M application, and an M2M SCL associated with the M2M traffic. Further, the transmitting at issue in Block 206 can be understood as transmitting the selected one or more M2M identifiers in at least one bearer establishment message sent from the M2M device, for establishing the bearer.

Also, as noted earlier herein, the selected one or more M2M identifiers that are selected for transmitting to the access network during bearer establishment generally do not have any meaning within the access network domain. Thus, the method 200 can be understood as additionally including the step of sending a MSISDN or other (access network) device identifier to the access network, as part of the access bearer establishment procedure suggested in Block 206. This device identifier has meaning within the access network domain and is used, for example, in authorizing the M2M device 10 for connection to the access network.

Figure 3:
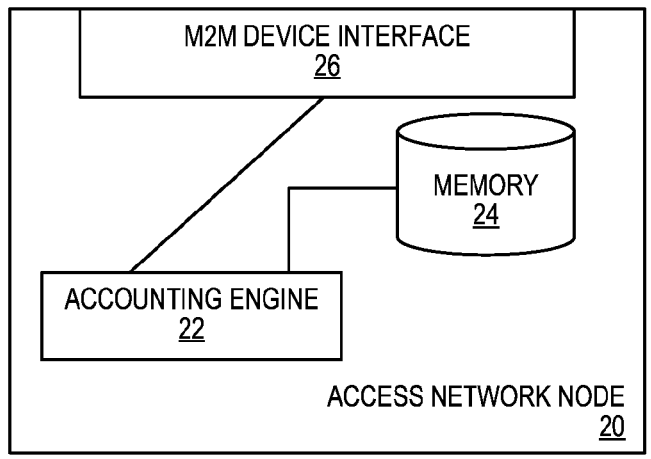
FIG. 3 is a block diagram of an Access Network Node according to an embodiment of the present invention.

In turning to network-side aspects of the teachings herein, FIG. 3 is a block diagram illustrating an example embodiment of an access network node 20, such as may be involved on the access network side with regard to any of the foregoing discussion regarding the M2M device 10.

In the illustrated example, the access network node 20 includes an accounting engine 22, a memory 24, and an M2M device interface 26 for communicating with M2M devices 10. In an example embodiment, a request to establish an access bearer including an M2M identifier is received by the M2M device interface 26. The access bearer identification and the M2M identifier are provided to processing circuitry within the access network node 20, where such circuitry comprises or otherwise includes the accounting engine 22. In turn, the accounting engine 22 is configured to store the M2M identifier along with other information associated with the access bearer channel, e.g., in the memory 24.

This association allows the stored data to later be used in a reconciliation process with the M2M service provider. That is, the access network node 20 allows the creation of the access bearer, and associates the included identifier with the records related to the access bearer. This allows for an optional reconciliation of traffic billing with the M2M service provider using data that will match the data used by the M2M service provider.

Thus, in one or more embodiments, an access network node 20 is configured to populate one or more M2M-relevant identities during access network bearer setup for an M2M device. In an example configuration, the access network node 20 comprises: an M2M device interface 26 configured to receive a request from the M2M device, requesting establishment of an access bearer for connecting the M2M device to an M2M service provider. For example, the M2M device interface 26 comprises a radio or other such interface for transmitting signals to and receiving signals from any number of M2M devices 10, e.g., over an air interface. In any case, the access request from the M2M device 10 includes one or more M2M identifiers from among the following M2M-relevant identities: an M2M application identifier, an M2M subscription identifier, and an M2M Services Capability Layer (SCL) identifier.

In turn, the access network node 20 includes processing circuitry, including an accounting engine 22, which circuitry is configured to establish an access bearer for the M2M device 10 responsive to the request and to associate the one or more M2M identifiers received in the request with the access bearer. Further, such circuitry is configured to record the one or more M2M identifiers as being associated with the access bearer, e.g., to store them in the memory 24 for use in determining one or more parameters for the access bearer and/or for usage records. For example, the accounting engine 22, which also may be implemented in another node, may store the M2M identifier(s) in association with usage records for the M2M device 10 with respect to the established bearer, and to use such records for billing the M2M service provider(s) at a level of billing granularity afforded by the M2M identifiers, e.g., at the M2M subscription level, or even on a per-M2M application level.

In a related embodiment, a machine-readable medium stores computer program code that, when executed by processing circuitry in an access network node 20, configures the access network node 20 to populate one or more M2M-relevant identities during access network bearer setup for an M2M device 10. The computer program code in this example configures the access network node processing circuitry to: receive a request from the M2M device 10, requesting establishment of an access bearer for connecting the M2M device to an M2M service provider. As before, the request includes one or more M2M identifiers from among the following M2M-relevant identities: an M2M application identifier, an M2M subscription identifier, and an M2M Services Capability Layer (SCL) identifier. The computer program code further configures the access network node processing circuitry to establish an access bearer for the M2M device 10 responsive to the request, associate the one or more M2M identifiers received in the request with the access bearer, and record the one or more M2M identifiers as being associated with the access bearer.

Figure 4:
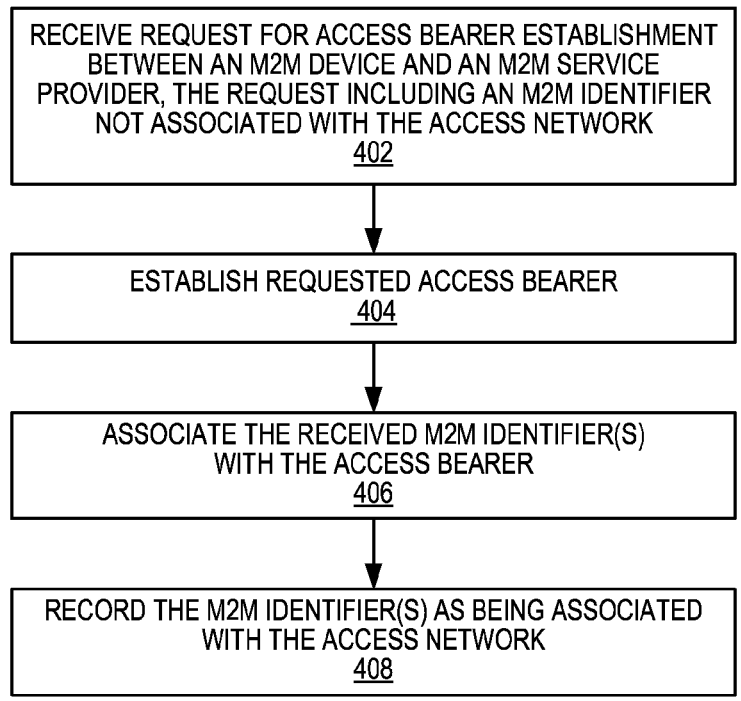
FIG. 4 is a flowchart illustrating a method according to an embodiment of the present invention.

FIG. 4 illustrates an example method 400 that is performed, for example, by the access network node 20 illustrated in FIG. 3. The method 400 enables the access network node 20 to populate M2M-relevant identities in conjunction with establishing an access bearer for an M2M device 10. The M2M-relevant identities generally have no specific meaning within the access network in which the access network node 20 operates but are advantageously provided from the M2M device 10 according to the teachings herein, for use in controlling bearer establishment and/or in improved accounting and billing, e.g., between an access network provider and an M2M SP.

The method 400 includes receiving (Block 402) a request from the M2M device 10, requesting establishment of an access bearer for connecting the M2M device 10 to an M2M service provider. The request includes one or more M2M identifiers from among the following M2M-relevant identities: an M2M application identifier, an M2M subscription identifier, and an M2M Services Capability Layer (SCL) identifier.

The method 400 continues with the access network node 20 establishing (Block 404) an access bearer for the M2M device 10 responsive to the request, associating (Block 406) the one or more M2M identifiers received in the request with the access bearer, and recording (Block 408) the one or more M2M identifiers as being associated with the access bearer. In one example, recording (Block 408) the one or more M2M identifiers as being associated with the access bearer comprises recording the one or more M2M identifiers against consumption data for the access bearer. In the same or another example, recording (Block 408) the one or more M2M identifiers as being associated with the access bearer comprises recording the one or more M2M identifiers in reconciliation data used for reconciling usage records determined by the access network for usage of the access bearer by the M2M device 10, with corresponding usage records determined by the M2M service provider.

As suggested in the example context of method 400, the access network node 20 in one or more embodiments comprises a node that establishes the access bearer and a node that operates as an accounting engine and maintains the reconciliation data. Of course, it is contemplated herein that such functionality may be split across two or more nodes—e.g., the M2M-relevant identities are transferred from the node that establishes the access bearer to another node that that perform accounting and reconciliation.

In at least one embodiment of the method 400, the one or more M2M identifiers received in the request include an M2M application identifier corresponding to an M2M application on the M2M device 10 for which the M2M device initiated the request. Correspondingly, the method 400 includes reconciling access network usage by the M2M device 10 on a per M2M application basis. Such reconciliation is based on using the M2M application identifier received in the request to reconcile access network usage data determined by the access network for usage by the M2M device 10 of the access bearer, with corresponding M2M service provider usage data determined by the M2M service provider.

The method 400 can be understood as including a step of receiving a MSISDN or other device identifier from the M2M device 10 in the request, in addition to the one or more M2M identifiers. This device identifier identifies the M2M device 10 within the access network domain. For example, the device identifier sent in addition to the one or more M2M identifiers is an IMSI, MSISDN, or other access network identifier from the M2M device 10 for use in establishing the access bearer. The access network node 20 uses the device identifier from the M2M device 10 for access control/authentication with respect to the access network itself. In this regard, it will be understood that the M2M device 10 generally has an access network subscription and credentials that are used by the access network, and includes one or more M2M service subscriptions and credentials (including one or more M2M identifiers) that are used by the M2M SP network.

Further, in at least one embodiment of the method 400, the one or more M2M identifiers received in the request include an M2M application identifier that is associated with one or more Quality-of-Service (QoS) requirements, and the method 400 further includes determining the one or more QoS requirements that are associated with the M2M application identifier, and establishing the access bearer in consideration of the associated one or more QoS requirements. In this regard, at least one of the M2M relevant identities received from the M2M device 10 is associated with a particular M2M application running on the M2M device 10, for which the M2M device 10 requested the access bearer.

Figure 5:
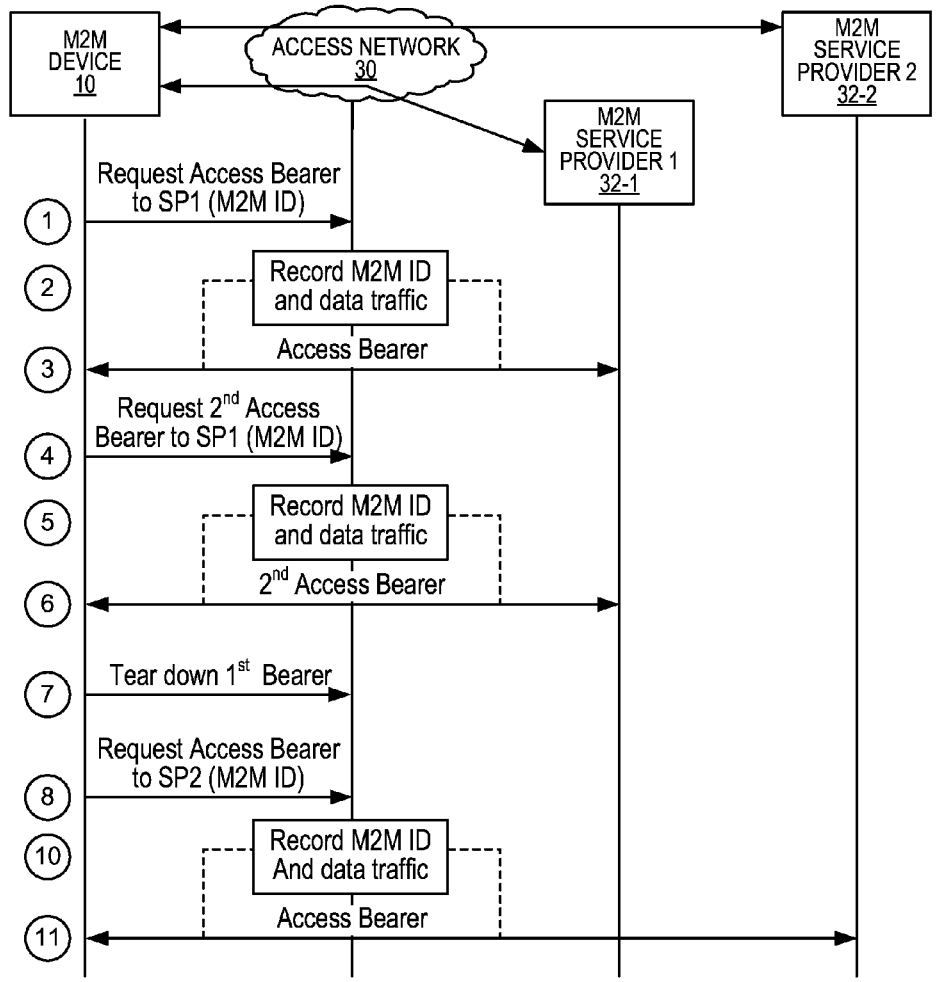
FIG. 5 is a call flow and architecture diagram illustrating an embodiment of the present invention.

FIG. 5 illustrates both a topology and a message flow between an M2M device 10 and an example access network 30, such as includes the aforementioned access network node 20, and two example M2M SP networks 32-1 and 32-2. It will be appreciated that each M2M SP network 32 corresponds to a different M2M NSCL and that the M2M device 10 generally will have different M2M SCL identifiers and M2M subscription identifiers with respect to the two different M2M SP networks 32. Along the same lines, the M2M device 10 in this example case can be assumed to run different M2M applications with different M2M application identifiers, with respect to the two M2M SP networks 32.

At Step 1, the M2M device 10 requests an access bearer for M2M communications with respect to M2M SP 32-1 (denoted as "SP1" in the diagram) and it provides one or more M2M identifiers to the access network 30 during the bearer establishment procedure, where such identifiers are associated with the M2M SP network 32-1. At Steps 2 and 3, correspondingly, the access network 30 records the M2M identifier(s) received from the M2M device 10 for its communications with the M2M SP network 32-1, and the access bearer is used to carry M2M traffic between the M2M device 10 and the M2M SP network 32-1. The recording step thus may include traffic data usage information, etc.

At Step 4, the M2M device 10 requests another access bearer for M2M communications with respect to M2M SP 32-1 and it provides one or more M2M identifiers to the access network 30 during the bearer establishment procedure, where such identifiers are associated with the M2M SP network 32-1. In one example, the bearer request at Step 1 is associated with M2M traffic for a first M2M application running on the M2M device 10 and the M2M device 10 therefore sends the matching M2M application identifier during the Step 1 access bearer request.

In the same example, the bearer request at Step 4 is associated with M2M traffic for a second M2M application running on the M2M device 10 and the M2M device 10 therefore sends the matching M2M application identifier during the Step 4 access bearer request. This arrangement enables the access network 30 to perform per M2M application billing reconciliation with the M2M SP associated with the M2M SP network 32-1 and/or allows the access network 30 to establish QoS or other parameters for the requested bearers on an application-specific basis. In either case, Steps 5 and 6 are the same as discussed for Steps 2 and 3, except they are associated with the second requested access bearer.

At Step 7, the M2M device 10 sends a request to tear down the access bearer requested in Step 1, which may trigger billing reconciliation or other data usage records processing. Continuing at Step 8, the M2M device 10 sends another bearer establishment request; however, this request is for M2M communications with the second M2M SP network 32-2. Thus, the M2M identifier(s) sent from the M2M device 10 to the access network 30 during the bearer establishment procedure will pertain to one or more of the M2M identifiers used for/with the M2M device 10 in the second M2M SP network 32-2, rather than in the first M2M SP network 32-1. In that regard, Steps 10 and 11 are like Steps 2 and 3 (or 5 and 6), except that they are performed with respect to the bearer established with respect to the second M2M SP network 32-2 at Step 8.

With the foregoing example embodiments in mind, the device and network side operations taught herein may be implemented via software product stored in a machine-readable medium (also referred to as a computer-readable medium, a processor-readable medium, or a computer usable medium having computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism.

Further, such machine-readable medium may contain various sets of instructions, code sequences, configuration information, or other data, which, when executed, cause a processor to perform steps in a method according to the example embodiments discussed herein, or variations and extensions of them. Those of ordinary skill in the art will appreciate that other instructions and operations necessary to implement the described operations may also be stored on the machine-readable medium. Software running from the machine-readable medium may interface with circuitry to perform the described tasks.

Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at an access network node of populating one or more Machine-to-Machine (M2M) relevant identities during an access network bearer setup for an M2M device, comprising:

receiving a request from the M2M device, requesting establishment of an access bearer for connecting the M2M device to an M2M service provider, wherein the request includes one or more M2M identifiers, belonging to an M2M service provider, from among the following M2M-relevant identities: an M2M application identifier and an M2M Services Capability Layer (SCL) identifier;

establishing an access bearer for the M2M device responsive to the request;

associating the one or more M2M identifiers received in the request with the access bearer; and recording the one or more M2M identifiers as being associated with the access bearer, wherein recording the one or more M2M identifiers as being associated with the access bearer comprises recording the one or more M2M identifiers against consumption data for the access bearer.

2. The method of claim 1, wherein recording the one or more M2M identifiers as being associated with the access bearer comprises recording the one or more M2M identifiers in reconciliation data used for reconciling usage records determined by the access network for usage of the access bearer by the M2M device, with corresponding usage records determined by the M2M service provider.

3. The method of claim 2, wherein the access network node comprises a node that establishes the access bearer and a node that operates as an accounting engine and maintains the reconciliation data.

4. The method of claim 1, wherein the one or more M2M identifiers received in the request includes an M2M application identifier corresponding to an M2M application on the M2M device for which M2M device initiated the request, and wherein the method includes reconciling access network usage by the M2M device on a per M2M application basis, based on using the M2M application identifier received in the request to reconcile access network usage data determined by the access network for usage by the M2M device of the access bearer, with corresponding M2M service provider usage data determined by the M2M service provider.

5. The method of claim 1, further comprising receiving a Mobile Station International Subscriber Directory Number (MSISDN) or other access network identifier from the M2M device in the request in addition to the one or more M2M identifiers, and using the MSISDN or other access network identifier for establishing the access bearer.

6. The method of claim 1, wherein the one or more M2M identifiers received in the request include an M2M application identifier that is associated with one or more Quality-of-Service (QoS) requirements and wherein the method further includes determining the one or more QoS requirements that are associated with the M2M application identifier, and establishing the access bearer in consideration of the associated one or more QoS requirements.

7. The method of claim 1, wherein the one or more M2M relevant identities are associated with a particular M2M application running on the M2M device, for which the M2M device requested the access bearer.

8. An access network node configured to populate one or more Machine-to-Machine (M2M) relevant identities during an access network bearer setup for an M2M device, said access network node comprising:
  an M2M device interface configured to receive a request from the M2M device, requesting establishment of an access bearer for connecting the M2M device to an M2M service provider, wherein the request includes one or more M2M identifiers, belonging to the M2M service provider, from among the following M2M-relevant identities: an M2M application identifier and an M2M Services Capability Layer (SCL) identifier; and
  processing circuitry, including an accounting engine, configured to:
    establish an access bearer for the M2M device responsive to the request;
    associate the one or more M2M identifiers received in the request with the access bearer;
    record the one or more M2M identifiers as being associated with the access bearer; and
    record the one or more M2M identifiers against consumption data for the access bearer.

9. A non-transitory machine-readable medium storing computer program code that, when executed by processing circuitry in an access network node, configures the access network node to populate one or more Machine-to-Machine (M2M) relevant identities during an access network bearer setup for an M2M device, based on configuring the processing circuitry to: receive a request from the M2M device, requesting establishment of an access bearer for connecting the M2M device to an M2M service provider, wherein the request
  includes one or more M2M identifiers, belonging to the M2M service provider,
  from among the following M2M-relevant identities: an M2M application
  identifier, and an M2M Services Capability Layer (SCL) identifier; establish an access bearer for the M2M device responsive to the request; associate the one or more M2M identifiers received in the request with the access bearer; record the one or more M2M identifiers as being associated with the access bearer; and record the one or more M2M identifiers against consumption data for the access bearer.

* * * * *